Jan. 8, 1952          E. SCHLUETER          2,581,816
FASTENER FOR BUTT JOINTS
Filed Aug. 17, 1948
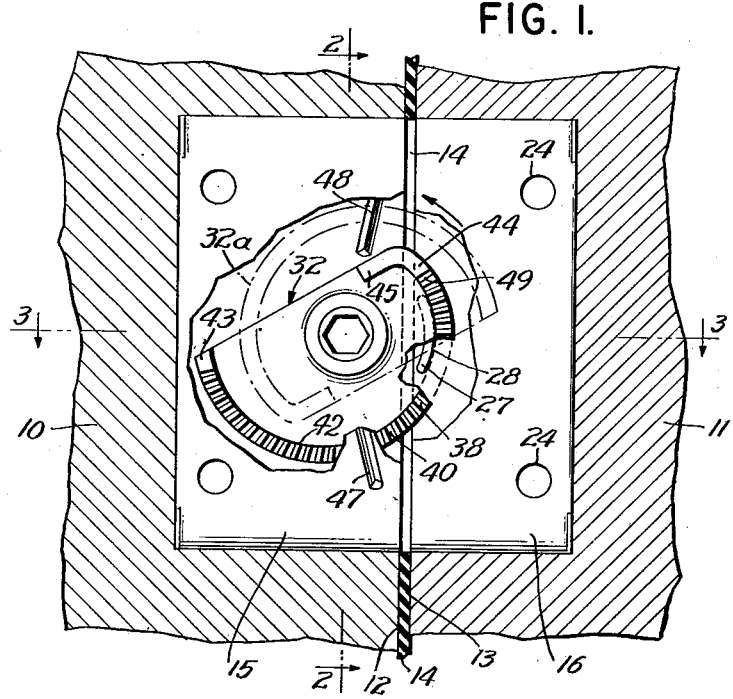
FIG. 1.
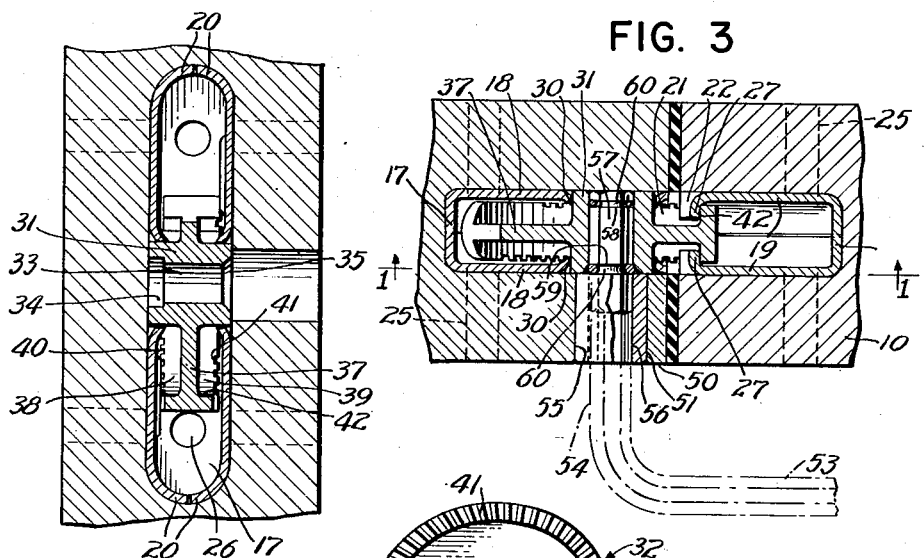
FIG. 2.
FIG. 3
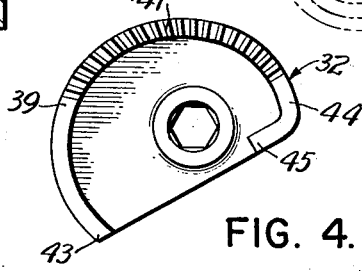
FIG. 4.
INVENTOR
ERNEST SCHLUETER
BY
ATTORNEY Patented Jan. 8, 1952

2,581,816

UNITED STATES PATENT OFFICE 2,581,816

FASTENER FOR BUTT JOINTS

Ernest Schlueter, Troy, N. Y., assignor to Simmons Fastener Corporation, Albany, N. Y., a corporation of New York Application August 17, 1948, Serial No. 44,721

16 Claims. (Cl. 70—57)

This invention relates to fastening devices for securing together adjacent structures having adjacent faces and more particularly to devices for securing together two panels having adjacent edge faces.

Objects of the invention are to provide an improved fastening device of this kind which may be quickly operated to reliably secure two panels together, and which will draw the two panels firmly together, which are adjustable to allow different thicknesses of gaskets between the panels, and which have no projecting parts. The fastening devices are particularly useful for securing together panels and other parts of ready-built portable houses;

Other objects of the invention are to provide an improved fastening device of this kind which accommodate inaccuracies in mounting the fasteners, and which will accommodate different thicknesses of panels.

Another object is to provide a fastener suitable for use in extremely cold arctic weather.

Additional objects of the invention are to effect simplicity and efficiency in such fasteners and to provide an extremely simple device of this kind which is convenient, speedy, durable and reliable in operation, and economical to manufacture and install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with a fastening device, for securing together butt faces of adjacent panels, which briefly stated includes a cam housing and a catch housing set in the respective panels, each having closely spaced side walls and a narrow open side adjacent to the other housing. The catch housing has opposed catches at said open side adapted to be engaged by a locking cam pivotally mounted in the cam housing and having a web parallel to the side walls and spiral peripheral lateral cam flanges having smooth inner faces engageable with said catches and having lateral notches yieldably engageable by detents on the walls of the cam housing.

In the accompanying drawing showing, by way of example, one of many possible embodiments of the invention, Fig. 1 is a side elevation or plan of the fastening device, parts being broken away, showing the device as securing together a pair of panels shown in fragmental section taken substantially on the line 1—1 of Fig. 3, looking in the direction of the arrows of said line;

Fig. 2 shows a section taken substantially on the line 2—2 of Fig. 1, looking in the direction of the arrows of said line;

Fig. 3 shows a section taken substantially on the line 3—3 of Fig. 1, looking in the direction of the arrows of said line; and Fig. 4 is a plan or elevation of the cam showing the side opposite to that of Fig. 1.

In the drawing the butt fastener is shown for fastening together panels 10 and 11 having adjacent edge faces 12, 13 having a gasket 14 therebetween. The fastener comprises a cam housing 15 and a catch or keeper housing 16 mortised in the abutting faces 13, 14 of the respective panels. Each of said housings comprises a single sheet of partly hardened cold rolled steel, sheet iron or other metal punched, stamped and bent to form a narrow back or bottom wall 17 (Fig. 3) parallel side walls 18 or 19 parallel to the broad faces of the panels and joining the back wall. The end margins of the side walls are bent and brought together to form outwardly curved end walls 20 (Fig. 2) which act as means to stiffen the edges of the side walls 18 and 19. Said housings have narrow open sides 21, 22 adjacent to each other, the gasket 14 being cut away to form an opening at said open sides.

The side walls of the housing have alined holes 24 near the ends for receiving pins 25 passing through said holes and the adjacent portions of the panels to hold the housings in place. The back walls 17 may also have screw holes 26 to receive screws to help hold the housing in place.

The mid part of the edges of the side walls 19 of the catch housing 16 adjacent to the open side 22 have projections 27 (Figs. 1 and 3) inturned toward each other and formed into arcuate catches or keepers 27, each having a concaved face 28 facing the interior of the catch housing, for a purpose presently to be explained.

The side walls 18, of the cam housing 15 are provided with alined bearing openings 30 (Fig. 3) opposite said catches 27 to receive a bearing hub 31 of a locking cam 32 in the cam housing. Said hub has therethrough a wrench receiving axial opening 33 (Fig. 2) of angular cross section having countersinks or enlarged diameter portions 34, 35 at the ends.

Said cam 32 comprises a web 37 in the central wide plane of the cam housing, adapted to pass between the catches 27, and spiral oppositely projecting lateral cam flanges 38, 39 on the periphery of the web, said flange respectively having series of notches 40, 41 in its lateral edge and having a smooth inner face 42 facing toward the hubs and adapted to engage said catches 27. Said flanges 38, 39 at the outer ends 43 are remote from the stub shafts and gradually nearer the stub shafts toward the inner end 44, whereby the cam may be rotated to bring the inner face 42 of the flanges into engagement with the catches 27 first at the outer end 43 and then gradually toward the inner end 44 thereby to draw the housings 15, 16 and the panels 10, 11 together. The inner end 44 of the flanges is turned inwardly as at 45 approximately normal to the curved inner end portion of the flanges to provide a stop to limit the tightening movement of the cam. Inwardly pressed detent ribs 47, 48 (Fig. 1) in the side walls of the cam housing approximately radial to said bearing openings form detents yieldably engageable with said notches 40, 41 to yieldably hold the cam in adjusted position. An additional notch 49 (Fig. 1) at the inner end of the flange 38 is engaged by the rib 47 to hold the cam retracted in the housing 15.

One face 50 (Fig. 3) of the panel 10 which contains the cam housing is provided with a bore 51 alined with the hub for the insertion into said wrench-receiving opening 33 of a wrench or key 53 (Fig. 3) consisting of an elbow shaped bar having an end part 54 of angular cross section adapted to fit into said opening 33 of angular cross section. Said end part 54 may be inserted directly into the opening 33 or into a wrench adapter including an exteriorly cylindrical tube 55 in said bore, flush with the face 50 of the panel and having therethrough an axial opening 56 of angular cross section adapted to receive said end part 54 and receiving a short rod 57 of angular cross section fitting into said axial opening 33 and projecting into said bore 51 and fitting in said opening 56 and having grooves 58, 59 therearound at the ends of the axial opening receiving detent rings 60 disposed in said grooves and countersinks 34, 35 (Fig. 2). The opening 56 is of angular cross section and receives the end part 54 of angular cross section of a wrench 53 or other turning key or tool for turning the cam.

The adapter tube is flush with the face of the panel, to give a more continuous face thereto. However, instead of the adapter, a plug or any suitable removable device or material may be used to fill the bore 51.

The operation will be easily understood from the foregoing. When panels 10, 11 or other structures are to be secured together, the cam is moved to the position of the dotted lines 32a (Fig. 1), or further so the notch 49 may receive the rib 47. The panels are brought approximately to the position of Fig. 1, and the cam rotated by means of the wrench 53 through the position of the dotted lines 32 in a clockwise direction of Fig. 1 until the faces 42 of the cam engage the outer faces 28 of the catches 27. The cam is forcedly turned until the panels are drawn tightly together with the cam in or near the position of the solid lines of Fig. 1. Reverse movement of the cam releases the panels.

When the panels are secured together, there are no projecting parts. Thus the fastening device is suitable for securing together floors, walls and other parts of portable houses. As the housings 15 and 16 are shallow, they may be mortised in the broad sides of panels of the thickness shown, thus making it possible to join one wide panel perpendicular to another wide panel, either at the edge to form a corner joint or intermediately to form a connection of T-shaped cross section.

The housing 15 may be made of half hard temper cold rolled steel which gives enough spring action to cause the ribs to effectively yieldably engage the teeth 40, 41 and 49 and remain operative even at temperatures as low as 70 degrees F. below zero.

Half-hard temper cold rolled stock has a Rockwell hardness range of about B70/90 and a tensile strength of about 64/85,000 p. s. i.

When the panels are to be separated, if the panels should stick together from the freezing of water or vapor at the faces 13, 14, or from other cause, the cam is turned by means of the wrench 53 approximately 285 degrees from the solid line position of Fig. 1 in a direction which is counterclockwise on Fig. 1 until the stop 45 engages ends of the catches 27, whereupon the flange is further forcibly turned by means of the wrench causing the stop 45 to push on the catches until the sticking is overcome and the panels are separated.

I claim as my invention:

1. A fastener comprising a cam housing having closely spaced side walls and a narrow open side adapted to be disposed adjacent a catch housing having opposed catches extended toward each other; a locking cam pivotally mounted in the cam housing and having a web parallel to the side walls, and peripheral cam flanges having lateral notches and smooth inner faces engageable with said catches; detents on the walls of the cam housing yieldably engageable with said notches.

2. For a fastener, a locking cam having a web having a hub and peripheral cam flanges having lateral notches and smooth inner faces, said flange being preferably discontinuous at a part of the web along a line nearer the web than the bottoms of the notches.

3. In a fastener, a cam housing having spaced side walls and a narrow open side; a locking cam pivotally mounted in the cam housing and having peripheral cam flanges; said cam having a series of notches angularly spaced about the axis of rotation of the cam; and detent means in said housing yieldably engageable with said notches.

4. In a fastener, a cam comprising a web; hubs on the web, and oppositely projecting lateral cam flanges on the periphery of the web and spiraled at least partially about the hub, each flange having a series of notches in its lateral edge and having a smooth inner face facing toward the hubs and adapted to engage a catch; the inner and outer faces of said flanges at the outer ends being remote from the hubs and gradually being nearer the hubs toward the inner end, and terminating in an end portion nearly normal to the adjacent portion of the flange and near to the hub, whereby upon extreme motion in the unlocking direction the external face of said end portion will engage and push away said catch.

5. In a fastener, a cam housing comprising a single sheet of slightly springy metal bent to form a narrow back wall, parallel side walls joining the back wall, the end margins of the side walls being bent and brought together to form outwardly curved end walls, said housing having a narrow open side; the side walls of the housing having alined bearing openings; and inwardly pressed detent ribs in the side walls of the cam housing approximately radial to said bearing openings and forming detents which yield when said side walls yield.

6. A fastening device for use with opposed catches and comprising a cam housing having closely spaced side walls and a narrow open side, the side walls of the cam housing having alined bearing openings; a locking cam in the cam housing and having bearing hubs in said bearing openings and having therethrough a wrench receiving axial opening of angular cross section having countersinks or enlarged diameter portions at both sides; said cam comprising a web in the central wide plane of the cam housing adapted to pass between the catches, and spiral oppositely projecting lateral cam flanges on the periphery of the web each flange having a series of notches in its lateral edge and having a smooth inner face facing toward the hubs and adapted to engage said catches; said flanges at the outer ends being remote from the hubs and gradually being nearer the hubs toward the inner end; whereby when the cam is rotated to bring first the outer ends and then the inner ends of the inner face of the flanges into engagement with the catches, the latter are drawn relatively toward the housing.

7. In a fastener, the combination of a cam housing having a yieldable wall; a locking cam pivotally mounted in the cam housing and having a web parallel to the side walls, and peripheral cam flanges having series of notches; and a detent on said wall engageable with said notches.

8. A fastening device for use with opposed catches and comprising a cam housing having closely spaced side walls and a narrow open side; a locking cam pivotally mounted in the cam housing and having a web parallel to the side walls, the peripheral cam flanges having lateral notches and having smooth inner faces engageable with said catches; the cam housing being made of springy metal; and detents on said walls of the cam housing yieldably engageable with said notches.

9. A fastening device for use with opposed catches and comprising a cam housing having closely spaced side walls and a narrow open side; a locking cam pivotally in the cam housing and having a web parallel to the side walls, and peripheral cam flanges having lateral notches and having smooth inner faces engageable with the catches; the inner end of the flanges being turned inwardly approximately normal to the curved inner end portion of the flange to provide a stop to limit the tightening movement of the cam; inwardly pressed detent ribs in the side walls of the cam housing approximately radial to said bearing openings and forming detents yieldably engageable with said notches to yieldably hold the cam in adjusted position.

10. A fastener for fastening together panels having adjacent faces each provided with mortise recesses respectively in one of which recesses is a catch housing having inturned catches, said fastener comprising a cam housing within the other recess and having parallel side walls and narrow open sides adjacent to each other end having alined bearing openings, a locking cam in the cam housing having in said bearing openings bearing hubs having therein a wrench-receiving opening; said cam comprising spiral lateral peripheral cam flanges engageable by said catches; said flanges at the outer ends being remote from the hubs and gradually nearer the hubs toward the inner end, whereby when the catches are engaged by said flanges and the cam is rotated the panels are drawn together; the inner end of the flanges being turned inwardly approximately normal to the curved inner end portion of the flange to provide a stop to limit the tightening movement of the cam; said stop serving on forcible reverse movement of the cam to engage the catches and push the panels apart.

11. A fastener comprising a springy metal cam housing of channel shape having a narrow web and wide flanges for the back and side walls respectively; stiffening means at the ends of each flange to prevent bending the flanges along lines remote from and substantially parallel to the web, said flanges being free to separate slightly by flexure of the housing in the zone of the web portion, a locking cam pivotally mounted in the cam housing and having peripheral cam flanges; said cam flanges having a series of notches open toward at least one of the side walls; and detent means on said one of the side walls and remote from the web zone and projecting inwardly and engageable with said notches.

12. A fastener comprising a one-piece cam housing of sheet metal of channel shape having a narrow web and wide flanges for the back and side walls respectively; said flanges being free to operate slightly by flexure of the housing in the zone of the web portion, a locking cam pivotally mounted in the cam housing and having peripheral cam flanges laterally projecting toward said side walls, said cam flanges having a series of notches open toward one of the side walls; and detent means on said one of the side walls and remote from the web zone and projecting inwardly and engageable with said notches.

13. A fastener comprising a one-piece cam housing of half-hard temper steel and of channel shape having a narrow web and wide flanges for the back and side walls respectively; stiffening means at the ends of the transverse ends of the flanges to prevent bending of the flanges along lines remote from and substantially parallel to the web, a locking cam pivotally mounted in the cam housing and having peripheral cam flanges projecting laterally toward said side walls, said cam flanges having a series of notches open toward the side walls; and detent means fast on at least one of said side walls and remote from the web zone and projecting inwardly and engageable with said notches.

14. For a fastener a one-piece housing of slightly yieldable cold rolled steel of channel shape having a narrow web and wide flanges for the back and side walls respectively, the two ends of each flange curving inwardly so as to nearly touch the corresponding ends of the respective flanges to prevent bending of the flanges along lines remote from the web substantially parallel to the web, said flanges being free to separate slightly by flexure of the housing in the zone of the web portion, alined bearing openings in the outer-mid-portions of the side walls and ribs on said side walls radial of said openings and remote from the web zone and projecting inwardly.

15. A fastener for fastening together panels having adjacent faces each provided with mortise recesses respectively in one of which recesses is a catch housing having inturned catches, said fastener comprising a cam housing within the other recess and having a cam pivoted in the cam housing, said cam comprising hubs and spiral lateral peripheral cam flanges engageable by said catches; said flanges at the outer ends being remote from the hubs and gradually nearer the hubs toward the inner end, whereby when the catches are engaged by said flanges and the cam is rotated, the panels may be drawn together; the inner end of the flanges being turned inwardly at least far enough so as never to completely emerge from the cam housing and approximately normal to the curved inner end portion of the flange to provide a stop to limit the tightening movement of the cam; said stop serving on forcible reverse movement of the cam to engage the catches and push the panels apart.

16. A lock or fastener comprising a one-piece housing of slightly spring hard metal of channel shape having a narrow web as a back wall and wide flanges as side walls the top and bottom marginal portions of the side walls inwardly bent to stiffen said portions, the side walls being slightly separable from each other by flexure of the metal in the zone of the web, and inwardly projecting projections fast on said side walls and remote from the back wall and adapted to engage a bolt or locking member.

ERNEST SCHLUETER.

REFERENCES CITED

The following references are of record in the file of this patent:

UNITED STATES PATENTS

| Number | Name | Date |
| --- | --- | --- |
| 42,994 | Sellers | May 31, 1864 |
| 296,807 | Wise | Apr. 15, 1884 |
| 824,652 | Herzog | June 26, 1906 |
| 835,425 | Herzog | Nov. 6, 1906 |
| 1,148,334 | Piotrowski | July 27, 1915 |
| 1,550,937 | Vogt | Aug. 25, 1925 |
| 2,340,864 | Carpenter | Feb. 8, 1944 |
| 2,423,695 | Falco | July 8, 1947 |